(12) United States Patent
Sumser et al.

(10) Patent No.: US 6,694,735 B2
(45) Date of Patent: Feb. 24, 2004

(54) INTERNAL COMBUSTION ENGINE WITH AN EXHAUST TURBOCHARGER AND AN EXHAUST-GAS RECIRCULATION DEVICE

(75) Inventors: Siegfried Sumser, Stuttgart (DE); Helmut Finger, Leinfelden-Echterdingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/278,724

(22) Filed: Oct. 23, 2002

(65) Prior Publication Data

US 2003/0115875 A1 Jun. 26, 2003

(30) Foreign Application Priority Data

Oct. 25, 2001 (DE) .......................... 101 52 803

(51) Int. Cl.$^7$ .......................... F02B 33/44; F02M 25/07
(52) U.S. Cl. .................... 60/605.2; 123/559.1
(58) Field of Search ................ 60/605.2, 602; 123/559.1

(56) References Cited

U.S. PATENT DOCUMENTS

| | | | | |
|---|---|---|---|---|
| 4,179,892 A | | 12/1979 | Heydrich | 60/605.2 |
| 5,791,146 A | * | 8/1998 | Dungner | 60/605.2 |
| 5,794,445 A | * | 8/1998 | Dungner | 60/605.2 |
| 5,943,864 A | * | 8/1999 | Sumser et al. | 60/605.2 |
| 6,216,459 B1 | * | 4/2001 | Daudel et al. | 60/605.2 |
| 6,220,233 B1 | * | 4/2001 | Pierpont | 123/568.12 |
| 6,230,682 B1 | * | 5/2001 | Gustafsson et al. | 60/605.2 |
| 6,237,335 B1 | * | 5/2001 | Lonnqvist | 60/605.2 |
| 6,324,847 B1 | * | 12/2001 | Pierpont | 60/605.2 |
| 6,598,396 B2 | * | 7/2003 | Bailey | 60/605.2 |

FOREIGN PATENT DOCUMENTS

| | | |
|---|---|---|
| DE | 196 18 160 | 11/1997 |
| DE | 196 51 498 | 4/1998 |
| DE | 198 57 234 | 9/2000 |

* cited by examiner

*Primary Examiner*—Sheldon J. Richter
(74) *Attorney, Agent, or Firm*—Klaus J. Bach

(57) ABSTRACT

In an internal combustion engine including an exhaust turbocharger and an exhaust-gas recirculation device, with an exhaust turbine and a compressor, the exhaust turbine has a plurality of inlet flow passages to which exhaust gas can be supplied via separate exhaust lines connected to some of the cylinders of the internal combustion engine. In total, three flow passages are provided in the exhaust turbine, of which two communicate with the exhaust-gas recirculation device, and one of these flow passages includes an adjustable throttling member for regulating the mass flow of exhaust gas to be recirculated.

12 Claims, 2 Drawing Sheets

INTERNAL COMBUSTION ENGINE WITH AN EXHAUST TURBOCHARGER AND AN EXHAUST-GAS RECIRCULATION DEVICE

BACKGROUND OF THE INVENTION

The invention relates to an internal combustion engine with an exhaust turbocharger including a turbine and a compressor and an exhaust-gas recirculation device, the turbine having a plurality of flow passages for feeding exhaust gas to the turbine rotor from two separate exhaust lines connected to different cylinders of the internal combustion engine.

Such an internal combustion engine is described in the printed publication DE 198 57 234 C2. The internal combustion engine is equipped with an exhaust turbocharger, the exhaust turbine of which has two spiral flow passages, which are supplied with exhaust gas via respective exhaust lines, each connected to a respective bank of cylinders of the internal combustion engine. The two flow passages have cross sections of different sizes, causing a higher exhaust backpressure in the line system leading to a smaller flow passage. This line system is connected to an exhaust-gas recirculation device, by means of which an adjustable mass flow of exhaust gas can be transferred from the exhaust section to the intake duct to reduce exhaust emissions. Owing to the higher pressure level in the smaller flow passage, the exhaust gas can be recirculated in a relatively large operating range of the internal combustion engine.

The determination of the size ratio of the two flow passages relative to one another is of decisive importance for the exhaust-gas and consumption behavior of the internal combustion engine.

It is the object of the present invention to provide an internal combustion engine with an exhaust gas turbocharger, which has low pollutant emissions and low fuel consumption.

SUMMARY OF THE INVENTION

In an internal combustion engine including an exhaust turbocharger and an exhaust-gas recirculation device, the turbocharger comprises an exhaust turbine and a compressor wherein the exhaust turbine has a plurality of inlet flow passages to which exhaust gas can be supplied via separate exhaust lines connected to some of the cylinders of the internal combustion engine. In total, three flow passages are provided in the exhaust turbine, of which two communicate with the exhaust-gas recirculation device, and one of these flow passages includes an adjustable throttling member for regulating the mass flow of exhaust gas to be recirculated.

By means of the adjustment of the throttling member, the mass flow of exhaust gas can be directed to the relevant flow passage to be regulated and, if appropriate, shut off completely, with the result that, where these two flow passages are supplied via a common exhaust line, the entire mass flow of exhaust gas in this line is directed into the flow passage without a throttling member, thereby allowing an increased pressure level to be set because of the overall smaller flow cross-section. As as result, exhaust-gas recirculation is possible in a larger operating range, in particular at low engine and charger speeds.

In an expedient embodiment, the throttling member, which is arranged either in the feed line to the flow passage or, alternatively, in the turbine casing, is part of a blow-off device, via which an adjustable portion of the mass flow of exhaust gas can be blown off, bypassing the exhaust turbine; in this case, the throttling member is preferably in the form of a three-way valve. Upon severe throttling, the exhaust-gas flow is forced into the flow passage without a throttling member, thereby providing therein for a higher pressure level. With blow-off, an impermissible excess pressure in the exhaust line can be avoided, in order to prevent overspeeding of the turbocharger.

In another expedient embodiment, exhaust gas is supplied to both flow passages involved in exhaust-gas recirculation via a common exhaust line, whereas the third flow passage, which is not involved in exhaust-gas recirculation, is connected to the internal combustion engine by a separate exhaust line. The two exhaust lines are advantageously connected to different banks of cylinders of the internal combustion engine, via which the exhaust gas from respective groups of cylinders of the internal combustion engine can be fed to the respective flow passages. Both symmetrical and asymmetrical division of the number of cylinders connected to each exhaust line is conceivable, the exhaust gas from the larger number of cylinders preferably being fed to the third flow passage, that is not involved in exhaust-gas recirculation.

The exhaust turbine is expediently equipped with variable turbine geometry, by means of which the flow inlet cross section of at least one flow passage leading to the turbine rotor can be set in a variable manner. The variable turbine geometry—e.g. a guide vane system that can be displaced axially into the flow inlet cross-section or a guide vane system with adjustable guide vanes—is advantageously situated in the flow inlet cross section of the flow passage that is not involved in exhaust-gas recirculation. In addition or as an alternative, the variable turbine geometry can also be arranged in the flow inlet cross-section of the flow passage that is involved in exhaust-gas recirculation and which also includes the throttling member. If appropriate, this variable turbine geometry can be adjusted independently of the flow passage that is separate from exhaust-gas recirculation.

The position of the variable turbine geometry can be used as an additional adjustment variable for the optimization of the powered mode and also of the engine-braking mode. Further possibilities of adjustment are obtained by adjusting the throttling member and, if appropriate, a recirculation valve located in a recirculation line of the exhaust-gas recirculation device.

The two flow passages involved in exhaust-gas recirculation are expediently smaller than the third flow passage, which is not involved in exhaust-gas recirculation. In establishing the size ratio, it is possible to use a turbine throughput parameter, which can be determined from the mass flow of exhaust gas, the temperature and the pressure in each flow passage. The sum of the turbine throughput parameters through the two smaller flow passages involved in exhaust-gas recirculation is expediently in a range of between 70% and 120% of the corresponding turbine throughput parameter for the larger flow passage, which is not involved in exhaust-gas recirculation. The relatively small flow passages, which communicate with the exhaust-gas recirculation device, allow a higher exhaust backpressure than the larger flow passage, which benefits exhaust-gas recirculation. It may be advantageous to make the flow passages involved in exhaust-gas recirculation smaller, when taken together, than the third flow passage, making the sum of the turbine throughput parameters of the two smaller flow passages smaller (less than 100%) than the turbine throughput parameter of the larger third flow passage.

Given the ratio of the turbine throughput parameters to one another, it is possible—if necessary after establishing absolute values for the turbine throughput parameters, e.g. as a function of the displacement of the internal combustion engine—to deduce the actual geometric dimensioning of each flow passage on the basis of an empirically or, if appropriate, analytically determined relationship. From such a relationship, it is possible, in particular, to determine the spiral cross section of each spiral flow passage and the radial distance between the central axis in the flow inlet of the spiral cross section and the axis of rotation of the turbine rotor. In principle, these geometric variables are sufficient for the design configuration of the flow passage.

In another advantageous embodiment, the size ratio of the two smaller flow passages, which are involved in exhaust-gas recirculation, can be determined from the ratio of the relevant turbine throughput parameters. The value for the throughput parameter of the flow passage without a throttling member is advantageously in a range of values between 40% and 150% of the turbine throughput parameter for the flow passage with a throttling member, values of less than 100%—flow passage without a throttling member smaller than flow passage with throttling member—being particularly advantageous since the smaller of the two flow passages allows a higher pressure build-up. In conjunction with the design rule mentioned above, all three flow passages can be dimensioned, if necessary after establishing an absolute amount, e.g. for the total turbine throughput parameter, which is formed by summing all three individual turbine throughput parameters, as a function of the displacement of the internal combustion engine or some other characteristic value.

The invention will become more readily apparent from the following description thereof, on the basis of the accompanying drawings.

DESCRIPTION OF PREFERRED EMBODIMENTS

Figure 1:
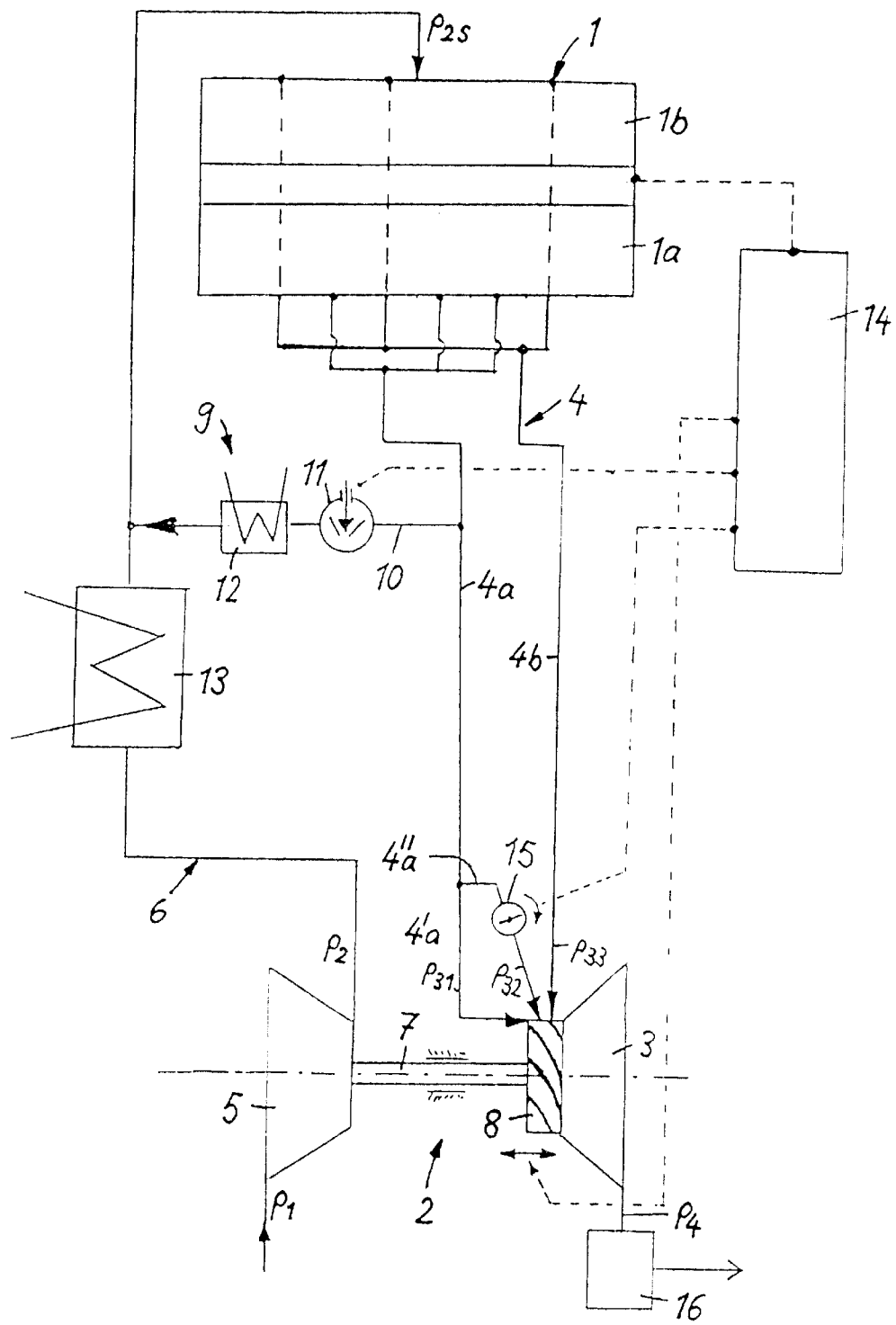
FIG. 1 shows a schematic representation of a turbocharged internal combustion engine with an exhaust-gas recirculation device.

In the following figures, identical components are provided with identical reference numerals.

The internal combustion engine 1 as illustrated in FIG. 1—a spark-ignition engine or a diesel engine—includes an exhaust turbocharger 2, comprising an exhaust turbine 3 in the exhaust section 4 of the internal combustion engine and a compressor 5 in the intake duct 6. The compressor 5 is driven by the exhaust turbine 3 via a shaft 7. The exhaust turbine 3 is provided with variable turbine geometry 8, by means of which the effective flow inlet cross section to the turbine rotor can be set in a variable manner. The variable turbine geometry 8 allows optimized operation both in the powered driving mode of operation and in engine-braking mode. The variable turbine geometry 8 may be a guide vane system that can be displaced axially into the flow inlet cross section; however, other design embodiments may also be considered, e.g. a guide vane system in the flow inlet cross section with adjustable guide vanes.

The internal combustion engine 1 has two banks 1a, 1b of cylinders. The exhaust gases from the cylinders of each bank of cylinders are discharged into two separate exhaust lines 4a and 4b, which are part of the exhaust section 4, and fed to the exhaust turbine 3. As can be seen more particularly in FIG. 2, the exhaust turbine 3 is of multi-passage design, the exhaust lines 4a and 4b being connected to different flow passages of the exhaust turbine 3. The exhaust turbine 3 expediently includes three inlet passages; the first exhaust line 4a being divided into two line sections, each of which is connected to one flow passage of the turbine, and the second exhaust line 4b supplying the third flow passage with exhaust gas.

The internal combustion engine 1 furthermore includes an exhaust-gas recirculation device 9 comprising a recirculation line 10 between the first exhaust line 4a and the intake duct 6, an adjustable recirculation valve 11 and an exhaust cooler 12 in the recirculation line 10. The return line 10 opens into the intake duct 6 down-stream of an intercooler 13. The level of the mass flow of exhaust gas recirculated can be regulated under the control of the recirculation valve 11.

The various units, in particular the variable turbine geometry 8, the recirculation valve 11 and a throttling member 15, which is situated in a line section of the first exhaust line 4a communicating with the exhaust-gas recirculation system, via which section exhaust gas can be fed to one of the two flow passages that are supplied via the exhaust line 4a, can be adjusted by means of a control and regulating unit 14 as a function of operating variables of the internal combustion engine.

The combustion air, which is drawn in at ambient pressure $p_1$, is first compressed to the increased pressure $p_2$ in the intake duct 6 by the compressor 5 and is then cooled in the intercooler 13.

The combustion air is subsequently fed to the cylinder inlets of the internal combustion engine at the boost pressure $p_{2s}$. The exhaust gas from the internal combustion engine is fed via the exhaust lines 4a and 4b to the exhaust turbine 3, the exhaust backpressure $p_{31}$ and $p_{32}$ respectively prevailing in the line sections 4a' and 4a" of the first exhaust line 4a, via which two of the flow passages are supplied with exhaust gas, and the exhaust backpressure $p_{33}$ prevailing in the second exhaust line 4b, which is connected to the third flow passage. After flowing through the exhaust turbine 3, the expanded exhaust gas is fed at the reduced pressure $p_4$ to a purification device 16—a catalytic converter and/or a soot filter—and then discharged.

Figure 2:
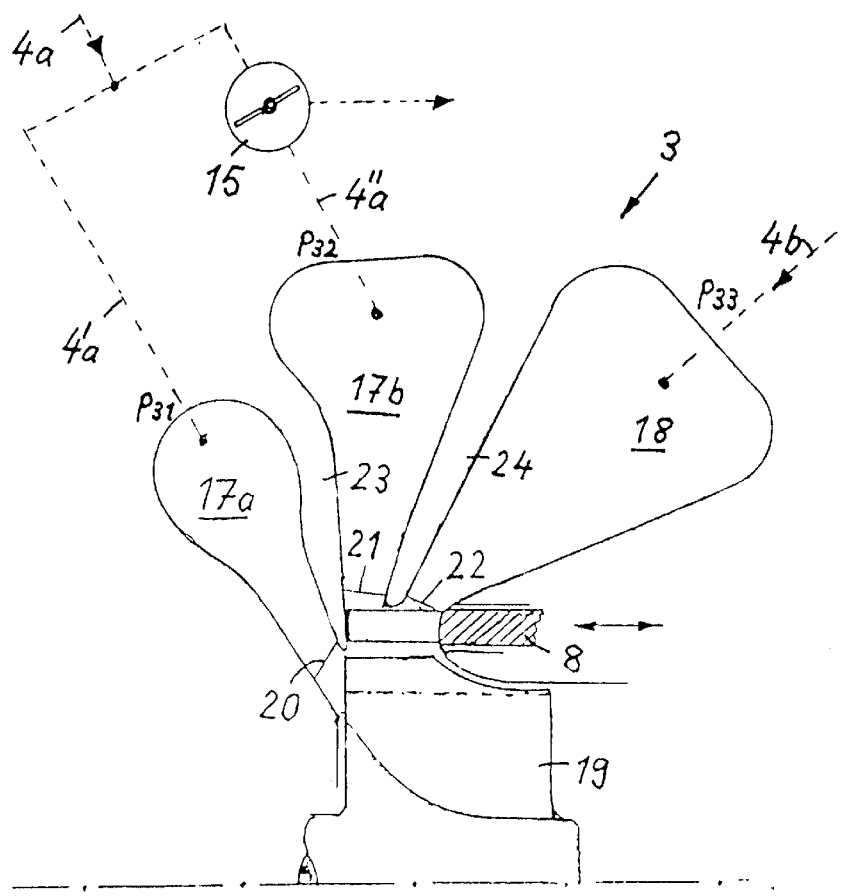
FIG. 2 is a schematic sectional representation of a three-passage exhaust turbine.

As can be seen from FIG. 2, the exhaust turbine 3 has a total of three spiral inlet flow passages 17a, 17b and 18, via which the exhaust gas supplied thereto can be fed to the turbine rotor 19. The first two flow passages 17a and 17b communicate with the exhaust-gas recirculation system and are supplied with exhaust gas via the first exhaust line 4a. The exhaust line 4a branches into two line sections 4'a and 4"a, the adjustable throttling member 15, by means of which the mass flow of exhaust gas to be fed to the flow passage 17b can be adjusted, being arranged in the latter line section. An adjustable mass flow of exhaust gas can also expediently be discharged or diverted by means of the throttling member 15, bypassing the turbine.

The third flow passage 18 is supplied with exhaust gas by the second exhaust line 4b.

The exhaust turbine 3 is embodied as a combination turbine and has a semi-axial flow inlet cross section 20 between the first flow passage 17a and the turbine rotor 19 and two radial flow inlet cross sections 21 and 22 between the second flow passage 17b and third flow passage 18 and the turbine rotor. The variable turbine geometry 8, which is designed as an axially displaceable guide vane system, can be introduced into the radial flow inlet cross section 22 of the third flow passage 18 and expediently also into the radial flow inlet cross section 21 of the second flow passage 17b. The three flow passages are expediently sealed off from one another in a pressure-tight manner by dividing walls 23 and 24.

The three flow passages 17a, 17b and 18 are each of different sizes. To determine the size ratio, the turbine throughput parameter $\phi$ for the flow passages can be determined, this being calculated in general form in accordance with the relation $$\phi = m_{3,S} \sqrt{T_{3,S}} / p_{3,S}$$

as a function of the mass flow $m_{3,S}$ of exhaust gas, the temperature $T_{3,S}$ and the exhaust backpressure $p_{3,S}$ in the region of the flow passage concerned, the index "S" denoting the choke line of the turbine, above which no further increase in the throughput parameter $\phi$ is possible.

To establish the size ratio of the two smaller flow passages 17a and 17b involved in exhaust-gas recirculation relative to one another, the relevant throughput parameters $\phi_{R1,S}$ and $\phi_{R2,S}$ of these flow passages are placed in relation to one another, this size ratio $\phi_{R1,S}/\phi_{R2,S}$ advantageously lying in the following range of values:

$$0.4 \leq (\phi_{R1,S}/\phi_{R2,S}) \leq 1.5$$

The lower limit 0.4 signifies that the smaller, first flow passage 17a, the feed line to which does not include a throttle, amounts to 40% of the value of the larger flow passage 17b, in the feed line of which the throttling member 15 is located. The upper limit 1.5 signifies that the turbine throughput parameter of the first flow passage 17a is 1.5 times the turbine throughput parameter of the flow passage 17b. However, a value of less than 1 is expediently chosen, making the first flow passage 17a smaller than the second flow passage 17b.

Figure 3:
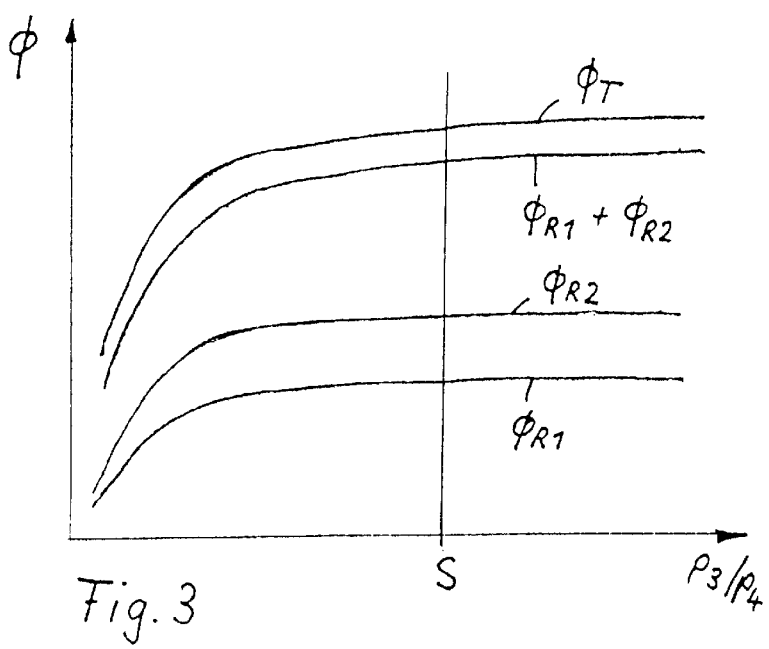
FIG. 3 shows a diagram illustrating characteristics of turbine throughput parameters as a function of the pressure ratio across the exhaust turbine.

The turbine throughput parameters $\phi_{R1,S}$ and $\phi_{R2,S}$ each relate to the choke line of the exhaust turbine, which is indicated in the diagram shown in FIG. 3 by the letter "S". From this figure, it can be seen that the turbine pressure ratio $p_3/p_4$—pressure drop across the exhaust turbine—remains essentially constant even when the pressure ratio increases. The turbine throughput parameters $\phi_{R1,S}$ and $\phi_{R2,S}$ are determined from the relations $$\phi_{R1,S} = m_{31,S} \sqrt{T_{31,S}} / p_{31,S}$$

$$\phi_{R2,S} = m_{32,S} \sqrt{T_{32,S}} / p_{32,S}$$

in which $m_{31,S}$ and $m_{32,S}$ denote the mass flow of exhaust gas through the flow passages 17a and 17b respectively, in the region of the choke line, $T_{31,S}$ and $T_{32,S}$ denote the associated exhaust-gas temperatures and $p_{31,S}$ and $p_{32,S}$ denote the associated exhaust-gas pressures.

The size ratio of the first two flow passages 17a and 17b, which communicate with the exhaust-gas recirculation system, and the larger flow passage 18, which is independent of the exhaust-gas recirculation system, can furthermore be determined in accordance with the relation:

$$0.7 \leq ((\phi_{R1,S} + \phi_{R2,S})/\phi_{T,S}) \leq 1.2$$

where the turbine throughput parameter $\phi_{T,S}$ is determined from $$\phi_{T,S} = m_{33,S} \sqrt{T_{33,S}} / p_{33,S}$$

in which $m_{33,S}$ denotes the mass flow of exhaust gas, $T_{33,S}$ denotes the exhaust-gas temperature and $p_{33,S}$ denotes the exhaust backpressure, in each case in the independent flow passage 18 in the region of the choke line of the turbine.

The lower limit 0.7 indicates that the sum of the turbine throughput parameters for the flow passages 17a and 17b amounts to 70% of the value of the turbine throughput parameter for the independent flow passage 18. The upper limit 1.2 accordingly signifies that the sum of the turbine throughput parameters of the smaller flow passage amounts to 120% of the corresponding value for the independent flow passage.

From the abovementioned size ratios of the smaller flow passages connected to the exhaust-gas recirculation system relative to one another and for the ratio of the sum of the smaller flow passages to the independent flow passage, it is possible to determine the geometry of each flow passage as long as a further absolute quantity for the turbine throughput parameters is established. This absolute quantity can be determined from the total turbine throughput parameter for each flow passage, for example, the sum of all the individual turbine throughput parameters for each flow passage, which bears an empirically or analytically determined relationship to the internal combustion engine used, e.g. to the displacement of the internal combustion engine. If the absolute value is known, the actual determination of the numerical values for the mass flows of exhaust gas, the temperatures and the exhaust backpressures in the region of the choke limit are not needed since it is possible, by means of the absolute value, to establish a normalization and, by means of the size ratios given above, to establish the ratio of the turbine throughput parameters relative to one another. From the numerical value for each turbine throughput parameter, it is possible to deduce from a further empirical or analytical relationship the geometric size of each flow passage, in particular the spiral cross section in the flow inlet and the radial distance in the flow inlet to the axis of rotation of the turbine rotor.

As can be seen from the diagram in FIG. 3, the turbine throughput parameter $\phi_{R1}$ of the first flow passage 17a is advantageously smaller than the turbine throughput parameter $\phi_{R2}$ of the second flow passage 17b. This has the advantage that, if the line section leading to the second flow passage is shut off by actuating the throttling member 15, the entire mass flow of exhaust gas from the first exhaust line is directed to the first flow passage 17a and, owing to the smaller dimensioning of this flow passage, a higher exhaust backpressure can be set, allowing exhaust-gas recirculation in a wide operating range.

It can furthermore be seen from FIG. 3 that the sum of the turbine throughput parameters $\phi_{R1} + \phi_{R2}$ is advantageously smaller than the turbine throughput parameter $\phi_T$ of the larger, independent flow passage 18. Owing to the large flow cross-section of the independent flow passage 18, high engine power output or, respectively, engine braking power can be achieved.

What is claimed is:

1. An internal combustion engine with an exhaust turbocharger including an exhaust turbine disposed in the exhaust duct and a compressor disposed in the intake duct of the internal combustion engine and connected to said turbine for rotation therewith, said exhaust turbine having a rotor and a housing with a plurality of flow passages via which exhaust gas can be conducted to the turbine rotor, said exhaust duct including two separate exhaust lines each of which is connected to some of the cylinders of the internal combustion engine and also a recirculation line with an exhaust gas recirculation device extending between at least one flow passage of said turbine and said intake duct, said exhaust turbine having three flow passages of which two flow passages are in communication with the exhaust gas recirculation device, one of these flow passages including an adjustable throttling member for regulating the mass flow of exhaust gas to be recirculated.

2. An internal combustion engine according to claim 1, wherein the size ratio ($\phi_{R1,S}/\phi_{R2,S}$) of the two flow passages involved in exhaust-gas recirculation, which is based on the turbine throughput parameters ($\phi_{R1,S}/\phi_{R2,S}$), lies in the following range of values:

$$0.4 \leq (\phi_{R1,S}/\phi_{R2,S}) \leq 1.5$$

where the turbine throughput parameters ($\phi_{R1,S}$, $\phi_{R2,S}$) in the region of the choke line (S) of the exhaust turbine can be determined from the relation $$\phi_{R1,S} = m_{31,S} \sqrt{T_{31,S}}/p_{31,S}$$

$$\phi_{R2,S} = m_{32,S} \sqrt{T_{32,S}}/p_{32,S}$$

in which $m_{31,s}$, $m_{32,s}$ denote the mass flow of exhaust gas through the first and second flow passage, involved in exhaust-gas recirculation, in the region of the choke line (S) of the exhaust turbine, $T_{31,S}$, $T_{32,S}$ denote the exhaust-gas temperature in the first and second flow passage involved in exhaust-gas recirculation, in the region of the choke line (S) of the exhaust turbine, $p_{31,S}$, $p_{32,S}$ denote the exhaust-gas pressure in the first and second flow passage involved in exhaust-gas recirculation, in the region of the choke line (S) of the exhaust turbine.

3. An internal combustion engine according to claim 1, wherein a size ratio (($\phi_{R1,S}+\phi_{R2,S})/\phi_{T,S}$) of the flow passages, which is based on the turbine throughput parameters ($\phi_{R1,S}$, $\phi_{R2,s}$, $\phi_{T,S}$), is formed by dividing the sum ($\phi_{R1,S}+\phi_{R2,S}$) of the turbine throughput parameters ($\phi_{R1,S}$, $\phi_{R2,S}$) of the flow passages (17a, 17b) involved in exhaust-gas recirculation by the turbine throughput parameter ($\phi_{T,S}$) of the third flow passage, this size ratio being in the following range of values:

$$0.7 \leq ((\phi_{R1,S}+\phi_{R2,S})/\phi_{T,S}) \leq 1.2$$

where the turbine throughput parameters ($\phi_{R1,S}$, $\phi_{R2,S}$, $\phi_{T,S}$) in the region of the choke line (S) of the exhaust turbine is be determined from the relation $$\phi_{R1,S} = m_{31,S} \sqrt{T_{31,S}}/p_{31,S}$$

$$\phi_{R2,S} = m_{32,S} \sqrt{T_{32,S}}/p_{32,S}$$

$$\phi_{T,S} = m_{33,S} \sqrt{T_{33,S}}/p_{33,S}$$

in which $m_{31,S}$, $m_{32,S}$, $m_{33,S}$ denote the mass flow of exhaust gas through the first and second flow passage involved in exhaust-gas recirculation, and through the third flow passage, in the region of the choke line (S) of the exhaust turbine, $T_{31,S}$, $T_{32,S}$, $T_{33,S}$ denote the exhaust-gas temperature in the first and second flow passage involved in exhaust-gas recirculation, and in the third flow passage, in the region of the choke line (S) of the exhaust turbine, $p_{31,S}$, $p_{32,S}$, $p_{33,S}$ denote the exhaust-gas pressure in the first and second flow passage (17a, 17b respectively) involved in exhaust-gas recirculation, and in the third flow passage (18), in the region of the choke line (S) of the exhaust turbine (3).

4. An internal combustion engine according to claim 1, wherein the flow passages are separated from one another in a pressure-tight manner.

5. An internal combustion engine according to claim 1, wherein the two flow passages involved in exhaust-gas recirculation can be supplied with exhaust gas via a common exhaust line, and the adjustable throttling member is arranged in a branch line of the common exhaust line.

6. An internal combustion engine according to claim 1, wherein the throttling member is a blow-off valve, via which an adjustable mass flow of exhaust gas can be discharged, for bypassing the exhaust turbine.

7. An internal combustion engine according to claim 1, wherein said two flow passages connected to the exhaust-gas recirculation device have a semi-axial flow inlet cross-section and a radial flow inlet cross-section leading to the turbine rotor (19).

8. An internal combustion engine according to claim 7, wherein the variable turbine geometry is arranged in the flow inlet duct of the radial flow passage involved in exhaust-gas recirculation.

9. An internal combustion engine according to claim 1, wherein said exhaust turbine includes a variable turbine geometry by which the flow inlet cross section between at least one flow passage and the turbine rotor can be controlled.

10. An internal combustion engine according to claim 9, wherein the variable turbine geometry is a guide vane system that can be moved axially into the flow inlet cross section.

11. An internal combustion engine according to claim 9, wherein the variable turbine geometry is arranged in the flow inlet cross section of the flow passage not involved in exhaust-gas recirculation.

12. An internal combustion engine according to claim 9, wherein the variable turbine geometry is arranged in the flow inlet passage of one of the flow passages involved in exhaust-gas recirculation.

* * * * *